UNITED STATES PATENT OFFICE 2,435,393

ARSENIC DERIVATIVES AND PROCESS OF PREPARING SAME

Cliff Struthers Hamilton, Lincoln, Nebr., and Clarence Kenneth Banks, Detroit, Mich., assignors to Parke, Davis & Company, Detroit, Mich., a corporation of Michigan No Drawing. Application June 19, 1943, Serial No. 491,564

13 Claims. (Cl. 260—242)

Arsenical derivatives of anilinopyrimidines have not been known previously. We have now found that anilinopyrimidines substituted in the benzene ring by arsenic groups have unusual pharmacological and chemotherapeutical properties and are of value as trypanocides and as intermediates in the production of other compounds of pharmaceutical interest.

The compounds of the invention are also unusual in that very small doses are sufficient for the treatment of experimental trypanosomiasis. This is of advantage in that it thereby becomes unnecessary to administer relatively large quantities of toxic arsenic compound, as was previously required, in order to get satisfactory therapeutic effects.

The new compounds of the invention have the formula,

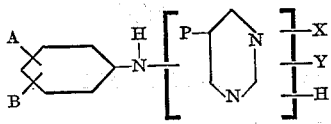

where A is a member of the class the arsono group (—AsO₃H₂), the salts of arsono groups (—AsO₃HM and —AsO₃M₂ where M is a basic salt-forming group, such as an alkali metal or an ammonium or substituted ammonium radical, such as alkylammonium, aralkylammonium, cycloalkylammonium, etc.), the arsinoso group or its hydrate (—AsO or —As(OH)₂), the dihaloarsinoso group (—AsHal₂' where Hal' represents chlorine, bromine or iodine), the arsine sulfide group (—As=S)

and the various dithioarsenite groups, —As(SR)₂, where R is an alkyl radical directly attached by a methylene linkage to the sulfur atom of —SR and may or may not contain the group —CONH—, said radical being substituted by one of —COOH and —COOM and substituted or not by one or more of —NH₂ and —NH₂.HA' whenever R contains —COOH, but by one or more of —NH₂ only when R contains —COOM, the group M being a basic salt-forming group, as already mentioned, A' being the anion of an acid having a dissociation constant of about 10⁻³·⁵ or more, such as hydrochloric or hydrobromic acid, sulfuric acid, phosphoric acid, tartaric acid, etc., where B is a member of the class, —H, —NO₂, —OH, —NH₂, hydroxyalkoxy and a halogen of the class chlorine, bromine and iodine, and where X and Y are members of the class —OH, —H, —NH₂, middle halogen (—Cl or —Br), lower alkyl such as methyl, ethyl, butyl, etc. and lower alkoxy such as methoxy, ethoxy, etc., and where P is a member of the class —H, —Cl, —Br, —NO₂ and —NH₂.

The new compounds may be prepared by two general methods. In each of these, whenever a halopyrimidine is reacted with an aminobenzenearsonic acid, it is preferred to employ an acidic reaction medium, for example in accordance with the procedure described in copending application of Clarence Kenneth Banks, Serial No. 464,250, filed November 2, 1942.

General method 1

Two compounds having the following formulas are reacted,

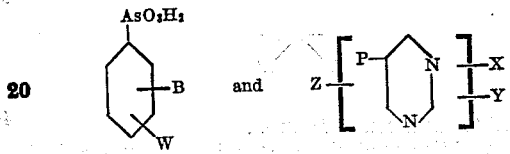

where W is a member of the class middle halogens and —NH₂, where one of W and Z is an amino group and the other is a halogen of the class chlorine and bromine and where B, X, Y and P are as previously defined. These two compounds are reacted in aqueous or non-aqueous solvents, in the presence of acid or alkali when advantageous for completion of the particular reaction involved, to give a desired compound which may be further modified at the arsenic group to give other members of the class A by application of various chemical procedures, such as those illustrated further herein. By way of illustration, a benzenearsonic acid containing an active halogen can be reacted with an amino pyrimidine (e. g. 3-nitro-4-bromobenzene arsonic acid and 2-aminopyrimidine to give 3-nitro-4-pyrimidyl-aminobenzenearsonic acid), or, an aminobenzenearsonic acid may be reacted with a chloro- or a bromopyrimidine (e. g. p-arsanilic acid and 2-amino-4-chloropyrimidine to give 2-amino-4-(4'-arsonoanilino) pyrimidine hydrochloride).

General method 2

Two compounds are reacted together having the following formulas,

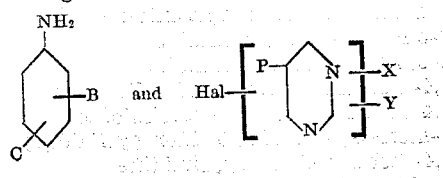

where B, X, Y and P are groups which have already been defined, where Hal is a middle halogen (chlorine or bromine) and C is nitro, amino, acylamino or other group capable of being converted to an amino group, for example by reduction or hydrolysis, said group C being in the meta or para position to the amino group. These two compounds are reacted according to the process described in the above mentioned application of Clarence Kenneth Banks and the product obtained has the formula,

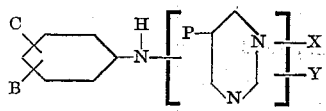

The group C of this product is then converted to the amino group, where necessary, and then the compound converted by diazotization of the amino group in aqueous or non-aqueous solvent and coupling with an inorganic arsenic compound (e. g. Bart or Scheller-Bart reaction) to give one of our new pyrimidine substituted arsonic acids coming under the general formula first given above. The arsonic acids can be further treated to modify the arsenical grouping as mentioned above under Method 1. If acid addition salts of the amino products are desired, it is an easy matter to react them with an acid, HA', to convert the group —NH—, connecting the benzene and pyrimidine nuclei, into the acid addition salt group

where A' is as already defined.

Some of the pyrimidine starting materials that may be used in Methods 1 and 2 and having the formula

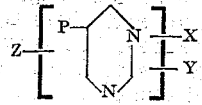

are:

2-amino-4-chloropyrimidine
4-amino-2-chloropyrimidine
2,4-dichloropyrimidine
2,4-diaminopyrimidine
2-amino-4-methoxypyrimidine
2-chloro-4-methoxypyrimidine
2-methoxy-4-chloropyrimidine
2-amino-4-chloro-6-methylpyrimidine
2-amino-4-methoxy-6-methylpyrimidine
4-amino-2-chloro-6-methylpyrimidine
4-amino-2-methoxy-6-methylpyrimidine
2,4-diamino-6-methylpyrimidine
2,4-dichloro-6-methylpyrimidine
2,4,6-trichloropyrimidine
2-amino-4,6-dichloropyrimidine
2,4-diamino-6-chloropyrimidine
4-amino-2,6-dichloropyrimidine
2-chloro-5-nitropyrimidine
2-chloro-5-aminopyrimidine
2,4-dichloro-5-bromopyrimidine
2,4-dichloro-6-methoxypyrimidine
2-methoxy-4-amino 6 chloropyrimidine
2,4-dichloro-5-nitropyrimidine
2-chloro-4-amino-5-nitropyrimidine Examples of arsonic acids for Method 1 that may be used to react with the pyrimidine compounds listed and having the general formula

are:

p-Arsanilic acid
m-Arsanilic acid
o-Arsanilic acid
3-amino-4-hydroxybenzenearsonic acid
3-amino-4-β-hydroxyethoxybenzenearsonic acid
3-amino-4-β-hydroxypropoxybenzenearsonic acid
3-amino-4-γ-hydroxypropoxybenzenearsonic acid
3-amino-4-β-methoxyethoxybenzenearsonic acid
3-amino-4-β-ethoxyethoxybenzenearsonic acid
3-amino-4-β-(β'-hydroxyethoxy) ethoxybenzenearsonic acid
3-amino-4-chlorobenzenearsonic acid
3-nitro-4-bromobenzenearsonic acid
4-amino-3-hydroxybenzenearsonic acid
4-amino-2-hydroxybenzenearsonic acid
4-amino-2-β-hydroxyethoxybenzenearsonic acid
5-amino-2-hydroxybenzenearsonic acid
5-nitro-2-bromobenzenearsonic acid Examples of compounds of formula

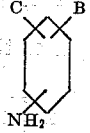

which may be used in Method 2 are:

p-Phenylene diamine
m-Phenylene diamine
p-Aminoacetanilide
m-Aminoacetanilide
p-Nitroaniline
m-Nitroaniline
p-Aminoazobenzene The details for reacting the compounds listed will be evident to those skilled in the art by reference to the following detailed example.

*Example 1* p-Arsanilic acid (40 g.), 2-amino-4-chloropyrimidine (20 g.), hydrochloric acid (5 ml.) and ethylhexyl alcohol (trace as a defoaming agent) are refluxed in water (2 l.) until complete solution occurs (about 15 minutes) and then for 15 minutes more. The solution is treated with activated charcoal while hot, filtered and concentrated hydrochloric acid (200 ml.) added and the solution cooled. A white crystalline mass is deposited which may be filtered off and recrystallized from dilute hydrochloric acid. The product, after drying in vacuo over a dehydrating agent is a white, crystalline substance, slightly soluble in water, melting above 250° C. and giving an arseno test with hypophosphorous acid. It is insoluble in organic solvent, contains ionic halogen and analyzes for 21.58% arsenic. The yield is 53 g. or nearly the theoretical amount expected. This compound is 2-amino-4-(4'-arsonoanilino) pyrimidine hydrochloride, for which the theory for arsenic is 21.62%.

2-amino-4-(4'-arsonoanilino) pyrimidine hydrochloride

This procedure may be varied by using 2-amino-4-bromopyrimidine in place of the chloro compound.

The volume of water is not critical and may be varied within wide limits, this particular volume being convenient for handling. The amount of hydrochloric acid used may be varied several fold or omitted, although its absence means that the reaction will require more time for completion. Basic condensing agents may be used but the yields will thereby be decreased and the impurities will be increased. Other acids may be used in the condensation, particularly mineral acids and the stronger organic acids. Mixed solvents may be used, such as alcohol-water, acetone-water, acetone-alcohol, dioxane-water, and other similar combinations without materially affecting the result.

The hydrochloride obtained above may be treated in warm aqueous solution or suspension with alkalies, such as ammonium hydroxide or sodium hydroxide, until the mixture is neutral to Congo red paper. The resulting white precipitate which is filtered off and dried is an arsonic acid, soluble in alkali and melting above 250° C. The product is a dihydrate and analyzes for 21.67% arsenic. The compound is the dihydrate of 2-amino-4-(4'-arsonoanilino) pyrimidine. The theory for arsenic is 21.65%. The yield is quantitative.

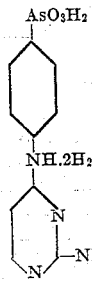

2-amino-4-(4'-arsonoanilino) pyrimidine dihydrate

This compound may be further dried to give the anhydrous material.

The arsonic acid obtained above is suspended in 250 ml. of water and sufficient sodium hydroxide to give a solution is added (two equivalents). The solution is filtered and the disodium salt thus formed is crystallized out of solution by the addition of alcohol and acetone or alcohol and ether. This salt is a white, crystalline product which may be variously hydrated. It is soluble to the extent of 35% in water. The yield is about 95% of theory or 52 g. On drying thoroughly, the anhydrous material is obtained, which contains 20.99% arsenic. Theory is 21.16%. The compound is disodium 2-amino-4-(4'-arsonoanilino) pyrimidine.

Disodium 2-amino-4-(4'-arsonoanilino) pyrimidine

As will be readily understood by one skilled in the art, if one wishes to have a different arrangement of groups in the benzene and pyrimidine nuclei or if different groups are desired, the reactants are so chosen to contain these groups and in such positions as desired.

From the foregoing descriptions it will be seen that the present invention provides new and useful arsonoanilinopyrimidines. Other and more specific examples of these new compounds are shown below:

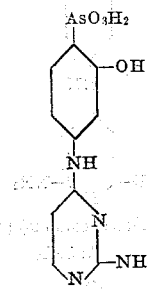

2-amino-4-(4'-arsono-3'-hydroxyanilino) pyrimidine

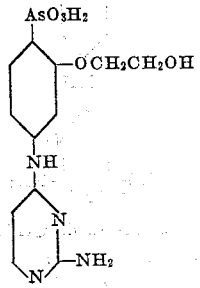

2-amino-4-(4'-arsono-3'-β-hydroxyethoxy-anilino) pyrimidine

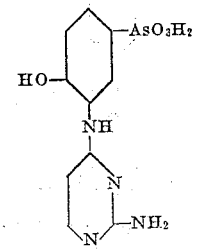

2-amino-4-(5'-arsono-2'-hydroxy-anilino) pyrimidine

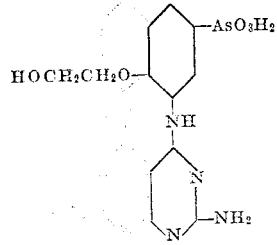

2-amino-4-(5'-arsono-2'-β-hydroxyethoxyanilino) pyrimidine

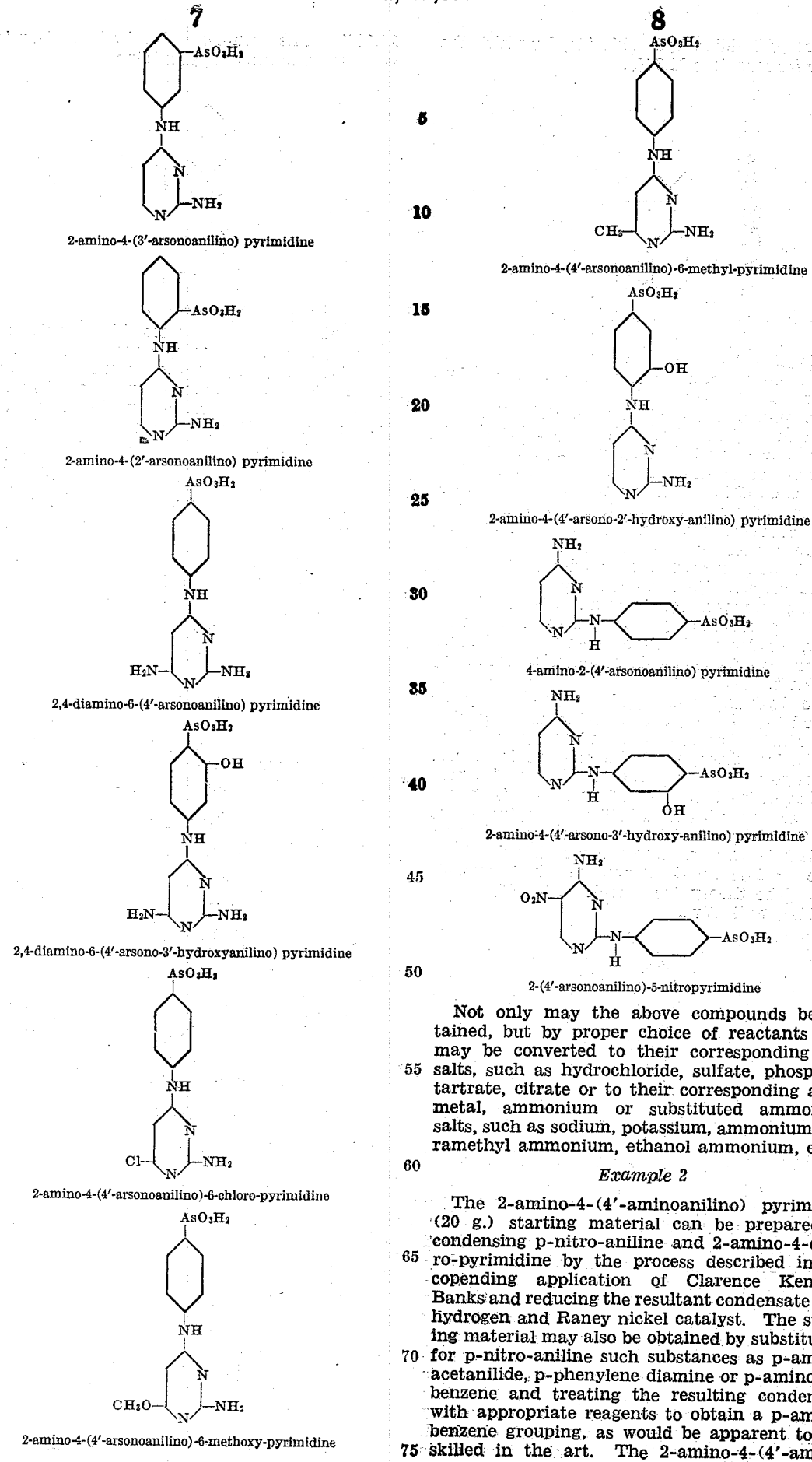

2-amino-4-(3'-arsonoanilino) pyrimidine 2-amino-4-(2'-arsonoanilino) pyrimidine 2,4-diamino-6-(4'-arsonoanilino) pyrimidine 2,4-diamino-6-(4'-arsono-3'-hydroxyanilino) pyrimidine 2-amino-4-(4'-arsonoanilino)-6-chloro-pyrimidine 2-amino-4-(4'-arsonoanilino)-6-methoxy-pyrimidine 2-amino-4-(4'-arsonoanilino)-6-methyl-pyrimidine 2-amino-4-(4'-arsono-2'-hydroxy-anilino) pyrimidine 4-amino-2-(4'-arsonoanilino) pyrimidine 2-amino-4-(4'-arsono-3'-hydroxy-anilino) pyrimidine 2-(4'-arsonoanilino)-5-nitropyrimidine Not only may the above compounds be obtained, but by proper choice of reactants they may be converted to their corresponding HA' salts, such as hydrochloride, sulfate, phosphate, tartrate, citrate or to their corresponding alkali metal, ammonium or substituted ammonium salts, such as sodium, potassium, ammonium, tetramethyl ammonium, ethanol ammonium, etc.

*Example 2*

The 2-amino-4-(4'-aminoanilino) pyrimidine (20 g.) starting material can be prepared by condensing p-nitro-aniline and 2-amino-4-chloro-pyrimidine by the process described in the copending application of Clarence Kenneth Banks and reducing the resultant condensate with hydrogen and Raney nickel catalyst. The starting material may also be obtained by substituting for p-nitro-aniline such substances as p-amino-acetanilide, p-phenylene diamine or p-aminoazobenzene and treating the resulting condensate with appropriate reagents to obtain a p-aminobenzene grouping, as would be apparent to one skilled in the art. The 2-amino-4-(4'-aminoanilino) pyrimidine is dissolved in dilute hydrochloric acid and diazotized with one-tenth mole of sodium nitrite. The diazonium solution is coupled with 0.15 mole of sodium arsenite solution containing a trace of copper salts. The coupled solution is freed of tars and the arsenical precipitated with hydrochloric acid. It is 2-amino-4-(4'-arsonoanilino) pyrimidine hydrochloride, the same product whose preparation is disclosed in Example 1.

*Example 3*

3-nitro-4-bromobenzenearsonic acid (18 g.) and 2-aminopyrimidine (10.5 g.) are dissolved in water and made basic to litmus paper with potassium hydroxide solution. The solution is refluxed in an oil bath for five hours while adding additional small quantities of potassium hydroxide solution at half-hour intervals. The solution is cooled and acidified with hydrochloric acid to Congo red paper. The yellow solid which separates is recrystallized twice from hot water and dried at 60° C. The product is easily soluble in water, even in the cold. On heating the dry solid, liquid crystals are formed at 148°–156° C. which melt to a clear liquid at 160°–163° C. The product analyzes for 22.18% arsenic. The theory requires 22.03% arsenic. It is 2-(4'-arsono-2'-nitro-anilino) pyrimidine.

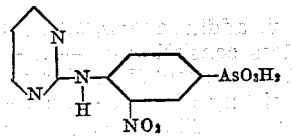

2-(4'-arsono-2'-nitro-anilino) pyrimidine

The same product is formed if the reaction of 3-nitro-4-bromobenzenearsonic acid and 2-aminopyrimidine is run in amyl alcohol or similar solvent using copper powder and sodium or potassium acetate as condensing agents.

*Example 4*

The product of Example 3 is dissolved in dilute sodium hydroxide and hydrogenated, using Raney nickel catalyst and molecular hydrogen at forty pounds pressure and room temperature. After removing the catalyst, the solution is acidified with hydrochloric acid to give a brownish material which is 2-(4'-arsono-2'-aminoanilino) pyrimidine.

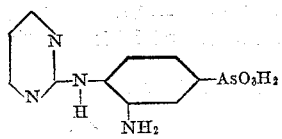

2-(2'-amino-4'-arsonoanilino) pyrimidine

By the same method, nitro compounds obtained under Example 1 may be reduced to amino compounds. For instance, 2-(4'-arsonoanilino)-5-nitro-pyrimidine gives

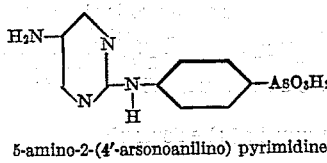

5-amino-2-(4'-arsonoanilino) pyrimidine

*Example 5*

2-amino-4-(4'-arsonoanilino) pyrimidine disodium salt is dissolved in a liter of water and concentrated hydrochloric acid added (about 100 ml.). The suspension formed is warmed while sulfur dioxide gas is passed through. A trace of potassium iodide is added and the sulfur dioxide continued until no iodine color appears on standing. After standing and cooling for twenty-four hours, the product is filtered off and purified by solution in hot water and reprecipitation with hydrochloric acid. It is a white crystalline product, not melting below 250° C. Analysis shows 20.31% arsenic, theory requires 20.38%. It is 2-amino-4-(4'-dichloroarsinosoanilino) pyrimidine hydrochloride.

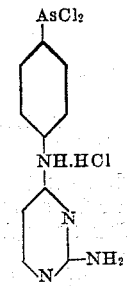

2-amino-4-(4'-dichloroarsinosoanilino) pyrimidine hydrochloride

When the above described product is dissolved in hot water and the solution made neutral to litmus paper with ammonia water, a white material is precipitated which is 2-amino-4-(4'-arsinosoanilino) pyrimidine monohydrate.

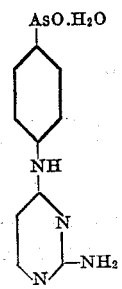

2-amino-4-(4'-arsinosoanilino) pyrimidine monohydrate

Analysis: As; found, 25.4%; required by the formula, 25.5%.

In place of 2-amino-4-(4'-arsonoanilino) pyrimidine, any of the products described in Examples 1, 2, 3 or 4, or any similar products, may be substituted in Example 5 to give the corresponding dichloroarsines and arsine oxides coming under the general formula for the new products.

*Example 6*

2-amino-4-(4'-arsinosoanilino) pyrimidine and two moles of thioglycollic acid or 2-amino-4-(4'-arsonoanilino) pyrimidine and four moles of thioglycollic acid are dissolved in an excess of sodium hydroxide solution. The solution is acidified and the resulting precipitate washed repeatedly with water. It is 2-amino-4-[4'-di-(carboxymethylenethio) arsinosoanilino] pyrimidine.

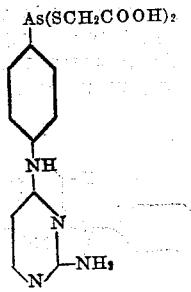

2-amino-4-[4'-di-(carboxymethylenethio) arsinosoanilino] pyrimidine

On dissolving the above product in alkali such as sodium hydroxide, soluble salts are obtained. For example, sodium hydroxide gives

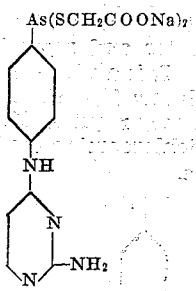

2-amino-4-[4'-di-(sodium carboxymethylenethio) arsinosoanilino] pyrimidine

When other sulfhydryl compounds are used in place of thioglycollic acid, corresponding derivatives are obtained. For example, cysteine gives

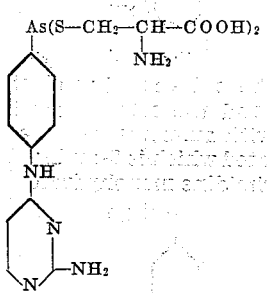

2-amino-4-[4'-di-(β-carboxy-β-aminoethylthio) arsinosoanilino] pyrimidine and glutathione gives

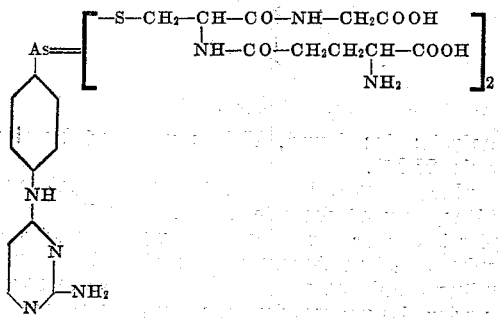

2-amino-4-(4'-diglutathienylarsinosoanilino) pyrimidine

In like manner, any of the arsonic acids or arsine oxides described in Examples 1, 2, 3, 4 and 5, or any like arsonic acids or arsine oxides coming under the general formula for the products, may be similarly reacted with sulfhydryl compounds to give corresponding sulfur containing arsenicals under the general formula.

The arsono compounds of the invention are of especial value since they not only embody compounds valuable as therapeutic agents, but include compounds which may serve as intermediates for compounds of therapeutic value. For example, arsono compounds of the formula,

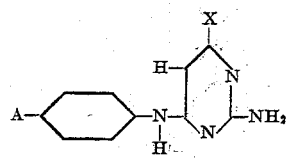

and their HA' acid addition salts, where A represents one of the pentavalent arsenic groups —AsO$_3$H$_2$, —AsO$_3$HM or —AsO$_3$M$_2$, can easily be reduced in presence of middle halogen acid to give the corresponding trivalent arsenical compounds and their hydrohalides, where A is one of —AsCl$_2$, —AsBr$_2$, and (by simple neutralization) —AsO and —As(OH)$_2$. In this way there are obtained the valuable arsenicals of formula

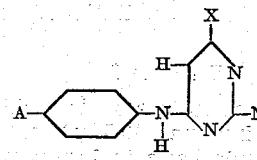

and their HA' acid addition salts, where X is as defined in the general formula and where A is a member of the class —AsCl$_2$, —AsBr$_2$, —AsO and —As(OH)$_2$, the group A' being the anion of an acid having a dissociation constant of at least about $10^{-3.5}$ and being —Cl whenever A is —AsCl$_2$ and —Br whenever A is —AsBr$_2$.

What we claim as our invention is:

1. A compound of the formula

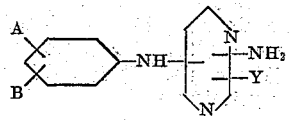

and its HA' acid addition salts, where B is a member of the class consisting of —H, —OH, —O-alkylene-OH, —NH$_2$ and NO$_2$, Y is a member of the class consisting of —H, —NH$_2$, —Cl, —Br, —alkyl, —alkylene-OH, A' is the anion of an acid having a dissociation constant of at least $10^{-3.5}$, A is an arsenical grouping of the class consisting of —AsO$_3$H$_2$, —AsO$_3$HM, —AsO$_3$M$_2$, —AsO, —As(SCH$_2$COOH)$_2$, and —As(SCH$_2$COOM)$_2$, and M is a basic salt-forming group.

2. A compound of the formula

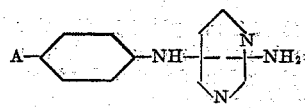

and its HA' acid addition salts, where A' is the anion of an acid having a dissociation constant of at least $10^{-3.5}$, A is an arsenical grouping of the class consisting of —AsO$_3$H$_2$, —AsO$_3$HM, —AsO$_3$M$_2$, —AsO, —As(SCH$_2$COOH)$_2$, and —As(SCH$_2$COOM)$_2$, and M is a basic salt-forming group.

3. A compound of the formula

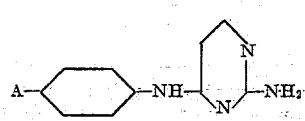

and its HA' acid addition salts, where A' is the anion of an acid having a dissociation constant of at least $10^{-3.5}$, A is an arsenical grouping of the class consisting of —AsO$_3$H$_2$, —AsO$_3$HM, —AsO$_3$M$_2$, —AsO, —As(SCH$_2$COOH)$_2$, and —As(SCH$_2$COOM)$_2$, and M is a basic salt-forming group.

4. A compound of the formula

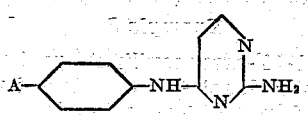

and its HA' acid addition salts, where A' is the anion of an acid having a dissociation constant of at least $10^{-3.5}$, and A is —AsO$_3$H$_2$ and its salts.

5. A compound of the formula

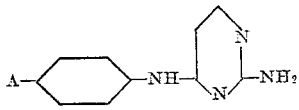

where A is —AsO$_3$H$_2$ and its salts.

6. A compound of the formula

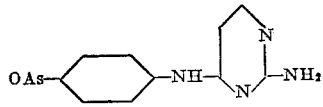

and its HA′ acid addition salts, where A′ is the anion of an acid having a dissociation constant of at least $10^{-3.5}$.

7. A compound of the formula

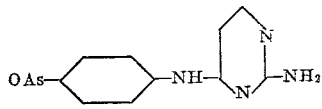

8. A compound of the formula

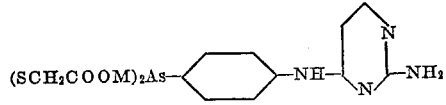

and its HA′ acid addition salts, where A′ is the anion of an acid having a dissociation constant of at least $10^{-3.5}$ and M is a member of the class consisting of H and a basic salt-forming group.

9. A compound of the formula

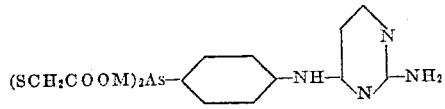

where M is a member of the class consisting of H and a basic salt-forming group.

10. Process for the preparation of anilinopyrimidine arsenicals which comprises reacting an anilino arsenical compound of formula

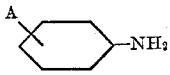

with a pyrimidine compound of formula

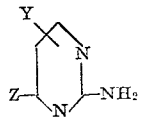

where Y is a member of the class consisting of —H, —NH$_2$, —Cl, —Br, —alkyl, and —alkylene-OH, Z is a member of the class consisting of —Cl and —Br, A is a member of the class consisting of —AsO$_3$H$_2$, —AsO$_3$HM and —AsO$_3$M$_2$, and M is a basic salt-forming group.

11. Process for the preparation of anilinopyrimidine arsenicals which comprises reacting an anilino arsenical compound of formula

with a pyrimidine compound of formula

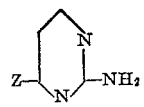

where Z is a member of the class consisting of —Cl and —Br, A is a member of the class consisting of —AsO$_3$H$_2$, —AsO$_3$HM and —AsO$_3$M$_2$, and M is a basic salt-forming group.

12. Process for the preparation of anilinopyrimidine arsenicals which comprises reacting an anilino arsenical compound of formula

with a pyrimidine compound of formula

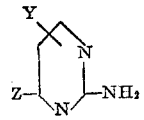

where Y is a member of the class consisting of —H, NH$_2$, —Cl, —Br, —alkyl, and —alkylene-OH, Z is a member of the class consisting of —Cl and —Br, A is a member of the class consisting of —AsO$_3$H$_2$, —AsO$_3$HM and —AsO$_3$M$_2$, and M is a basic salt-forming group.

13. Process for the preparation of anilinopyrimidine arsenicals which comprises reacting an anilino arsenical compound of formula

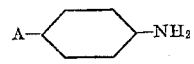

with a pyrimidine compound of formula

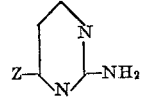

where Z is a member of the class consisting of —Cl and —Br, A is a member of the class consisting of —AsO$_3$H$_2$, —AsO$_3$HM and —AsO$_3$M$_2$, and M is a basic salt-forming group.

CLIFF STRUTHERS HAMILTON.
CLARENCE KENNETH BANKS.